March 17, 1964   W. O. BROOKS   3,125,715
REGULATED POWER SUPPLY CIRCUITS
Filed April 22, 1959                              2 Sheets-Sheet 1

WILLIAM O. BROOKS
INVENTOR.

BY
ATTORNEYS

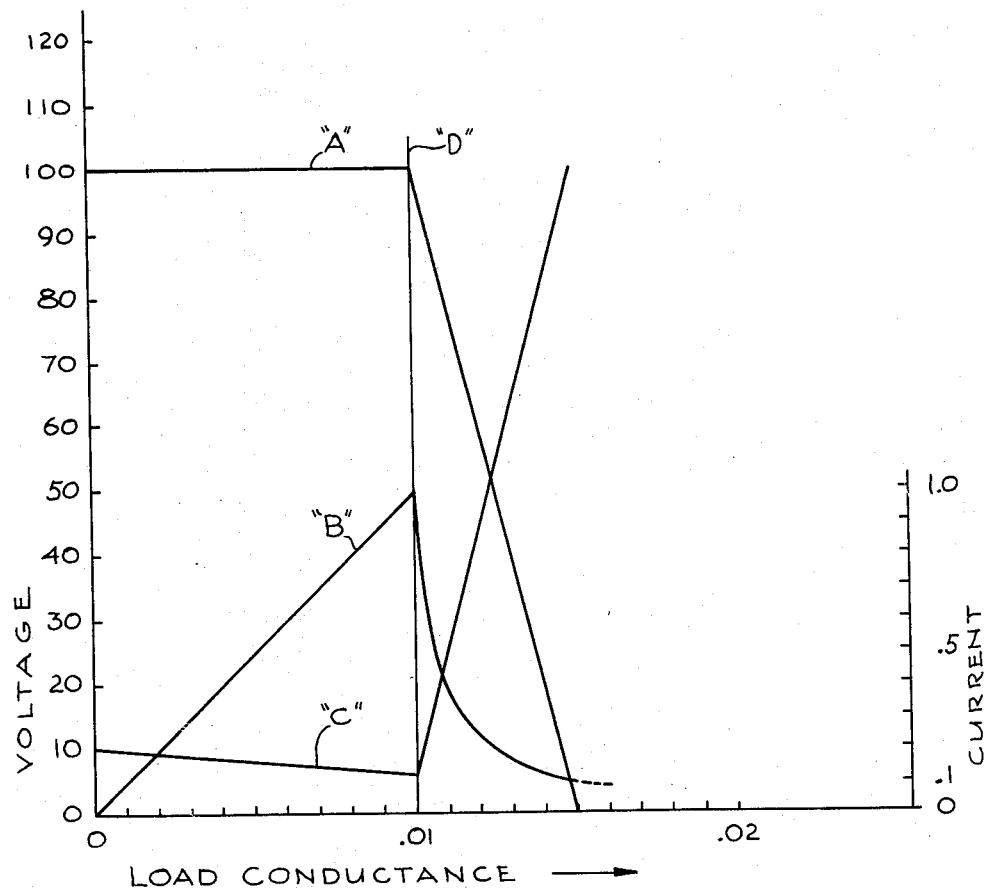

United States Patent Office 3,125,715
Patented Mar. 17, 1964

3,125,715
REGULATED POWER SUPPLY CIRCUITS
William O. Brooks, Los Angeles, Calif., assignor to Thompson Ramo Wooldridge Inc., Los Angeles, Calif., a corporation of Ohio
Filed Apr. 22, 1959, Ser. No. 808,028
4 Claims. (Cl. 323—22)

This invention relates to power supply circuits, and more particularly to a new and improved regulated power supply circuit having a protective circuit connected thereto for limiting the maximum power dissipation within a regulating element during overload conditions.

In power supply circuits for providing an output voltage having a substantially constant value, one or more regulator devices may be connected between a source of primary supply voltage and a pair of output terminals. Under certain conditions of operation, currents may be drawn from a regulated power supply which produce excessive power dissipation within the regulator device. For example, overload currents may arise from an accidental short-circuiting of the power supply as well as from the malfunction of a load circuit connected to the power supply output terminals.

Where electron tubes are employed as regulator devices, an accidental short-circuiting of the power supply output terminals generally does no permanent damage since most electron tubes possess a relatively high internal impedance which limits short-circuit or overload currents to reasonable and safe values at least for time periods sufficiently long to permit conventional thermal fuse type protection. In addition, the maximum current flow in an electron tube is limited to the saturation current which is reached when the current includes all of the limited number of electrons made available by the cathode structure. On the other hand, controllable conductance semi-conductor type transducing devices, such as transistors, generally possess a very low internal impedance which does not inherently limit the current flow therethrough to safe values. Also, in present-day commercial power transistor devices, the current flow is by means of mobile charge carriers within a body of semiconductor material, and no inherent current limiting effect is present for current densities below that at which damage to the semi-conductor device occurs due to an excessive power dissipation.

One important factor in the overload failure of known transistors appears to be the power dissipation produced at the junctions within the transistor. The junction power dissipation characteristic of a transistor for short term currents may be referred to as the "$i^2t$" rating of the device in somewhat the same way as thermal fuses are rated where $i$ equals the current flow and $t$ equals time. The "$i^2t$" rating is dependent upon the heat transfer characteristic of the semi-conductor material itself, as well as the heat transfer characteristic of the junction materials and conductors connected thereto. Short-term current overload in a given power transistor, for practical purposes, may, therefore, be thought of as occurring only when current overload of a predetermined value "$i_s$" is sustained therethrough for a period of time "$t_s$" causing the quantity of $i_s^2 t_s$ to exceed a predetermined value which may be termed the fault value F (in amp.$^2$ secs.).

The junction power dissipation characteristic $i^2t$ is to be distinguished from the maximum permissible long term power dissipation rating of a given transistor device which is based upon the maximum permissible continuous power dissipation therein when the device is operating in thermally coupled relation to its surroundings which may include a "heat sink" of predetermined capacity. Accordingly, the permissible value of overload current $i_s$ during a short interval of time may be several times larger than the continuous value of current which would produce a power dissipation in excess of the maximum continuous power dissipation rating.

In my co-pending application filed May 16, 1958, Serial Number 735,768 issued July 2, 1963 as United States Patent Number 3,096,475, entitled "Electrical Apparatus," there is described a regulated power supply in which a protective circuit is arranged to limit the current flow through one or more transistor devices under overload conditions to a value less than the $i^2t$ rating. In the apparatus of said co-pending application, a threshold means is actuated in response to overload current conditions to alter the bias on a regulating transistor in a direction which limits the current flow therethrough to a value less than the $i^2t$ rating. In operation, the apparatus functions as a constant current source under overload conditions.

Although the apparatus described in said Patent Number 3,096,475 functions satisfactorily to protect transistor devices from damage under conditions in which the operation of the protective circuit reduces the current flow through the transistor device to a level at which the power dissipation therein is less than the maximum permissible power dissipation rating of the transistor device, it has been found that in the regulation of relatively high voltages from a primary voltage source, the regulating transistor may be damaged under overload conditions due to an excess power dissipation even though the protective circuit reduces the current flow through the transistor device to a level less than the maximum $i^2t$ rating of the device. That is, under overload or short-circuit current conditions in a series regulated power supply, a substantial portion of the primary supply voltage appears across the regulator device, which when taken with what otherwise would be a safe value of current flow, results in excessive power dissipation.

Since the power dissipation within the regulator device is equal to $E \times I$, where E is the voltage across the regulator device and I is the value of the current flow therethrough, it is apparent that the current value I must be reduced to a very low value to hold the power dissipation within safe limits under conditions in which the voltage, E, appearing across the regulating device is of high value. For series regulated power supplies operating in conjunction with primary supply sources of relatively low voltage, the current limiting protective circuit of the aforesaid patent is eminently satisfactory since the relationship between the voltage, E, and the current I in the regulating device need not exceed the power dissipation rating of the device. However, in series regulated power supplies operating in connection with primary supply voltages which produce a voltage drop across a transistor of substantial value under overload current conditions, there must be provided some additional means for the protection of the transistors from power dissipation damage during overload current conditions.

The present invention, therefore, has as a principal object the provision of an improved regulated power supply in which a new type of protective circuit functions to reduce the power dissipation within a regulating element during overload current conditions.

It is another object of the present invention to provide an improved series regulated power supply in which a regulating transistor is protected from both short term and long term damage under overload current conditions.

It is yet another object of the present invention to provide an improved regulated power supply in which the current flow through a regulating element is controlled as an inverse function of load conductance during overload conditions.

In accordance with one aspect of the present invention, a regulated power supply is provided in which at least one regulating element functions to control the voltage appearing at a pair of output terminals, and a protective circuit is adapted to control the flow of current through the regulating transistor as an inverse function of the conductance of a load or other circuit path connected to the output terminals so that the power dissipation occurring within the regulating element is maintained at a safe value.

In accordance with another aspect of the invention, a regulated power supply is provided in which a voltage regulating means is coupled to a regulating element for the purpose of maintaining a substantially constant value of output voltage between a pair of output terminals over a range of values of current flow through the regulating element productive of power dissipation therein below a maximum permissible power dissipation rating, and a protective circuit is coupled to the regulating element for the purpose of controlling the flow of current through the regulating element as an inverse function of the conductance of a load or other circuit connection between the output terminals under overload current conditions.

In accordance with still another aspect of the invention, a regulated power supply is provided in which a voltage regulating means is coupled to a regulating element for the purpose of maintaining a substantially constant value of output voltage between a pair of output terminals, and a protective circuit is coupled to the regulating element which is adapted to disable the voltage regulating means in response to the flow of overload currents between the output terminals to limit the current flow through the regulating element to values less than the $i^2t$ rating of the element and thereafter to control the average current flow through the regulating element as an inverse function of the conductance of a load or other circuit path connected between the output terminals so that the power dissipation within the regulating element is maintained within the maximum power dissipation of the element for all possible values of load conductances.

A protective circuit in a series regulated transistorized power supply, in acordance with the invention, may include a protective circuit which senses the valve of the conductance between the output terminals and functions to bias the regulating transistor in such a way as to reduce the average current flow through the transistor to a level at which the power dissipation within the transistor is less than the predetermined maximum permissible value.

In one exemplary arrangement of the invention, the protective circuit includes a switching arrangement which intermittently reduces the current flow through the transistor to a negligible value with a duty cycle between substantial current flow and negligible current flow being established by the value of the conductance of the load circuit so that the average value of current flow produces a power dissipation within the transistor lower than a predetermined maximum permissible power dissipation rating. Accordingly, even though a substantial voltage may appear across the transistor under overload current conditions acompanying high load conductances, the average current flow through the transistor is reduced to a level at which the transistor remains undamaged.

In accordance with another arrangement of the invention, a current limiting protective circuit may be employed in conjunction with a voltage sensing protective circuit to sense the value of load conductance and to reduce the current flow through the transistor under overload conditions as an inverse function of load conductance so that the product of the voltage across the transistor and the current value therethrough is equal to a power dissipation less than the maximum power dissipation rating of the transistor. In response to an overload current being drawn from the power supply, the current limiting circuit reduces current flow through a regulating transistor which, in turn, increases the voltage drop across the transistor. The voltage sensitive protective circuit then functions in response to the increased voltage drop across the transistor to reduce the current flow therethrough still further. Since the voltage drop across the transistor is an inverse function of load conductance, the current flow through the transistor is reduced as an inverse function of load conductance to a level at which the relationship between the voltage across the transistor and the current flow therethrough represents a power dissipation less than the maximum permissible power dissipation rating of the transistor. Acordingly, the transistor is protected from damage during overload conditions through the combined action and cooperation of the current limiting protective circuit and the voltage sensitive protective circuit.

In an exemplary embodiment of the invention utilizing combined current limiting and voltage sensitive circuits, overload current conditions may be sensed by means of a threshold device connected across an impedance through which the current returns to the primary power supply for use in actuating the current limiting protective circuit, and a voltage sensitive device such as a zener diode may be connected across the transistor to sense excess values of voltage for actuating the voltage sensitive protective circuit by means of which the current flow through the transistor is controlled as an inverse function of the load conductance.

Each of the above described embodiments of the invention may include a voltage regulating means coupled to the transistor for maintaining a substantially constant value of output voltage over a range of values of current flow through the transistor which do not exceed $i^2t$ rating of the transistor and which do not produce power dissipation in excess of the maximum power dissipation rating of the transistor. A protective circuit, in accordance with the invention, used in conjunction with a voltage regulating means functions to disable the voltage regulating means under overload conditions to limit the current flow through the transistor to less than the $i^2t$ rating and thereafter to control the average value of current flow therethrough as an inverse function of load conductance so that the transistor is protected from damage for all possible values of load conductance, i.e., overload.

A better understanding of the invention may be had from a reading of the following detailed description and an inspection of the drawings, in which:

FIG. 2 is a graphical illustration of the relationship between various voltages and currents appearing in a regulated power supply in accordance with the invention as a function of the value of load conductance;

Figure 1:
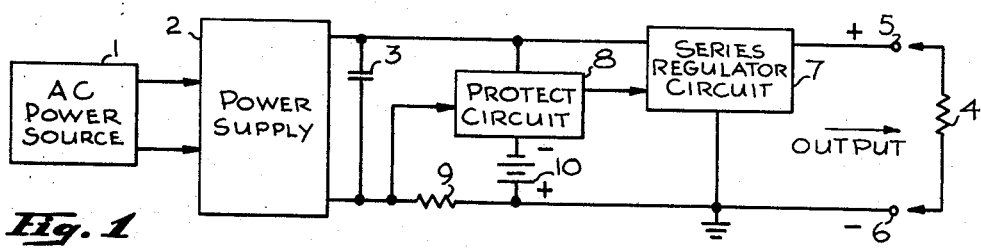
FIG. 1 is a combined block and schematic circuit diagram of a regulated power supply in accordance with the invention including a protective circuit utilizing a nonlinear element.

In the block diagram of FIG. 1, there is illustrated a power supply in acordance with the invention in which an alternating current wave derived from a conventional A.C. power source 1 is passed to a power supply 2 including rectifier means which functions to derive a unidirectional (D.C.) voltage from the alternating current wave. A filter capacitor 3 functions to smooth any residual alternating current components from the unidirectional voltage. Generally, the rectifier means of the power supply 2 will possess a substantial amount of internal impedance so that the value of the rectifier voltage appearing across the capacitor 3 varies with fluctuations in the amount of current flow drawn by a load 4 from a pair of output terminals 5 and 6.

In order to provide a substantially constant regulated voltage at the output terminals 5 and 6, a regulating circuit 7 is connected serially between the power supply 2 and the output terminal 5. In operation, the series regulator circuit 7 functions to maintain a substantially constant voltage between the output terminals 5 and 6. However, where an overload condition occurs, such as for example, a short circuit between the terminals 5 and 6 or a malfunction of the load 4 which draws an excessive amount of current from the terminals 5 and 6, the series regulator circuit 7 may be subjected to conditions of current flow and voltage drop which produce excessive internal power dissipation. Particularly where the series regulator circuit 7 is employed in conjunction with a primary source of unidirectional voltage such as the power supply 2 for producing a relatively high voltage, an overload condition may result in a relatively high voltage appearing across the series regulator circuit 7 with a consequent high internal power dissipiation in accordance with the relationship $P=EI$, where E represents the voltage appearing across the series regulator circuit 7 and I represents the current flow therethrough.

In order to overcome the aforementioned difficulty of excessive power dissipation occurring under overload conditions, the arrangement of FIG. 1 includes a protect circuit 8 which senses the value of the voltage appearing across a current sampling resistor 9 connected in the return to the power supply 2. The protect circuit 8 may be biased below ground by means of a suitable source of bias potential illustrated in FIG. 1 as a cell 10. Thus, the protect circuit 8 functions in response to a voltage appearing across the resistor 9 to control the series regulated circuit 7 in a manner which reduces the average current flow therethrough to a level at which the relationship of the voltage appearing across the regulator circuit 7 and the current flow therethrough produces an internal power dissipation which is not excessive.

While in my issued patent mentioned above a protective circuit is employed to reduce the current flow through a transistor regulating device to a level less than the $i^2t$ rating of the device under overload conditions, where a series regulator is employed with a primary source of unidirectional voltage of relatively high value in the manner of FIG. 1, a short-circuiting of the output terminals 5 and 6 or an extreme overload current condition accompanying a high value of load conductance produces a voltage drop across the series regulator circuit 7 which, when taken in combination with the current flow therethrough, produces an excessive internal power dissipation even when the protective circuit is functioning properly to reduce the current flow below the $i^2t$ rating.

Accordingly, it is contemplated that in the arrangement of FIG. 1 an improved protect circuit be arranged to include means for sensing an overload current condition along with means for determining the value of the conductance of the load circuit, i.e. degree of overload, and means for reducing the average value of current flow through the regulator circuit 7 as an inverse function of the value of the load conductance so that the power dissipation within the regulator circuit 7 is held at or below the maximum permissible power dissipation, even though substantially the full value of the voltage from the power supply appears as a voltage drop across the series regulator circuit 7. In this connection, the biasing of the protect circuit 8 below ground by the biasing cell 10 operating in conjunction with the means for limiting and controlling the current flow from the regulator circuit 7, functions to disable the normally operative regulating circuit arrangement within the series regulator circuit 7 which would otherwise tend to maintain a substantially constant voltage between the output terminals 5 and 6.

The operation of the arrangement of FIG. 1 for various values of load conductance may best be understood by reference to FIG. 2 in which there is illustrated the relationship between various voltages and currents appearing in a regulated power supply in accordance with the invention as a function of the value of load conductance. Curve "A" represents the output of the power supply appearing between the terminals 5 and 6, curve "B" represents the current passing through the series regulator 7 and curve "C" represents the voltage drop appearing across the series regulator circuit 7. For values of load conductance from zero up to a predetermined maximum corresponding to the maximum permissible power dissipation of the series regulator 7, the output voltage as represented by curve "A" remains substantially constant while the value of the current flow through the series regulator circuit 7 represented by curve "B" rises. Reflecting the operation of the regulating means included within the series regulator circuit 7 in maintaining the output voltages substantially constant over a range of values of load conductance, curve "C" indicates that the voltage drop across the series regulator circuit 7 drops as the load conductance rises in normal operation.

Values of load conductance in excess of the maximum rating represented in the graphical illustration of FIG. 2 as a vertical line "D" bring the protect circuit 8 into operation, in accordance with the invention, to control the current flow through the series regulator circuit 7 as an inverse function of the value of load conductance so as to limit the power dissipation within the series regulator circuit 7 to a value within the rating of the circuit. Thus, for higher values of load conductance in FIG. 2, the regulating action is disabled with the output voltage represented by curve "A" rapidly dropping with increases in load conductance. The current flow through the regulator circuit represented by the curve "B" is reduced as an inverse function of the value of the load conductance. As may be expected under conditions of high load conductance, the voltage appearing across the regulator circuit as represented by the curve "C" rises. However, so long as the product of the voltage drop across the regulator circuit and the current flow through the regulator circuit does not exceed the maximum permissible power dissipation rating of the circuit, no damage to the power supply is produced by an overload condition. Thus, as illustrated in FIG. 2, a regulated power supply including a protect circuit, in accordance with the present invention, is capable of operation for all possible values of load conductance without any damage arising due to the excessive internal power dissipation normally encountered in previously known arrangements.

Figure 3:
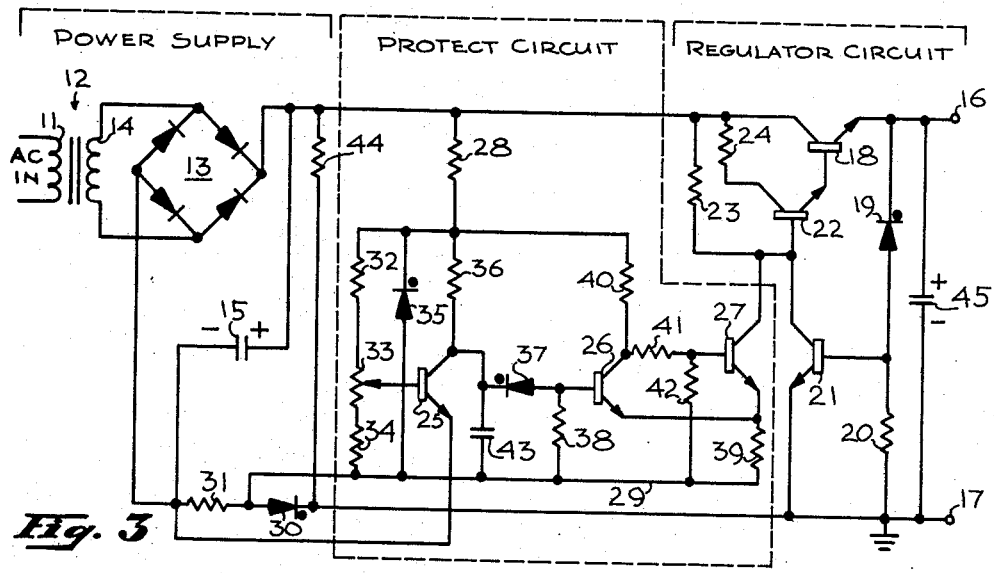
FIG. 3 is a schematic circuit diagram of a regulated power supply in accordance with the invention including a protective circuit utilizing a non-linear switching circuit.

FIG. 3 illustrates a form of the invention in which a protective circuit includes a switching means for the control of the power dissipation occurring within a series regulating element. In the schematic circuit diagram of FIG. 3, an alternating current wave from a power source may be applied to a primary winding 11 of a transformer 12 and a bridge rectifier circuit 13 is connected across a secondary winding of the transformer 12 to derive a unidirectional voltage from the alternating current wave. A filter capacitor 15 is connected across the bridge rectifier 13 to by-pass unwanted alternating current components and to smooth the unidirectional voltage.

In order to provide a substantially constant regulated voltage at the output terminals 16 and 17, a regulating transistor 18 is connected serially between the bridge rectifier 13 and the output terminal 16. The regulating transistor 18 may be one of many commercially available types having a current and power handling characteristic adequate for supplying average load current demands for which the power supply is intended. In practice, the transistor 18 may be of the "power transistor" variety, and although the transistor 18 is shown to be of the N-P-N variety, the circuit may be readily modified to employ a transistor of the P-N-P type.

In normal operation, the transistor 18 is controllably biased to so control its conductance as to maintain a constant voltage between the output terminals 16 and 17 with a variable portion of the voltage delivered by the bridge rectifier 13 appearing between the collector and emitter of the transistor 18. In order to apply a control bias to the transistor 18 to regulate the voltage from the output terminals 16 and 17, a negative voltage feedback control circuit is employed. In FIG. 3, the negative feedback control circuit responds to a voltage representing the variations in voltage appearing between the output terminals 16 and 17, although it will be appreciated that the feedback control circuit may be arranged to respond to variations in voltage appearing across the bridge rectifier 13 along with or instead of variations in voltage between the terminals 16 and 17. One such arrangement in which a negative voltage feedback control circuit responds to a composite signal based upon variations in voltage appearing across a rectifier and across a pair of output terminals in a series regulated power supply circuit as shown and described in my issued patent mentioned above.

In FIG. 3, a substantially fixed potential source in the form of a zener diode 19 connected serially with a resistor 20 operates as a voltage divider in which a constant voltage is subtracted from the output voltage by the fixed potential source so that substantially the entire amplitude of any fluctuations of the output voltage appear across the resistor 20 and are applied to the base of a control transistor 21 which may be, for example, an N-P-N type. The emitter-collector output terminals of the transistor 21 are connected between the base of an amplifying transistor 22 and the grounded negative output terminal 17. A resistor 23 is connected from the positive side of the bridge rectifier 13 to the base of the amplifying transistor 22 and applies a bias to the base of the transistor 22 in a forward direction.

The amplifying transistor 22 is normally conducting so that a forward bias is, in turn, derived via resistor 24 and applied to the base of the regulating transistor 18. The regulating transistor 18 is, therefore, normally conducting so as to present a low impedance, i.e., high conductance between the rectifier 13 and the output terminal 16. By virtue of the collector of the control transistor 21 being more positive than the emitter or base, it, too, will be rendered normally conducting. However, since the collector of the transistor 21 is connected to the base of the amplifying transistor 22 which has its emitter, in turn, connected to the base of the regulating transistor 18, a variation in collector current of the control transistor 21 produces a variation in voltage drop across the resistor 23 which varies the potential appearing at the base of the amplifying transistor 22, hence, controlling the base emitter current of the regulating transistor 18 which, in turn, varies the impedance or conductance appearing between the collector and emitter of the regulating transistor 18.

Accordingly, if a drop occurs in the voltage appearing between the terminals 16 and 17, a drop in the value of the potential across the resistor 20 results and the control transistor 21 operating through the amplifying transistor 22 increases the base emitter current of the transistor 18 which increases the collector-emitter conductance thereof so as to reduce the voltage drop appearing between the collector and emitter. Thus, the reduction in voltage drop across the regulating transistor 18 adjusts and increases the potential between the terminals 16 and 17 in a direction which tends to maintain the output voltage constant.

On the other hand, any tendency for the voltage between the terminals 16 and 17 to increase causes an increase in the voltage appearing across the resistor 20, an increased current flow through the transistor 21 with a resultant decrease in emitter-base current of the transistor 18 and a decrease in the collector-to-emitter conductance of the transistor 18. Thus, an increase in voltage drop across the transistor 18 adjusts and decreases the potential between the terminals 16 and 17 in a direction which tends to maintain a constant output voltage.

While the negative feedback control circuit in the power supply of FIG. 3 described above operates satisfactorily over a wide range of variations in current drawn by a load circuit from the terminals 16 and 17, under overload current conditions the negative feedback control circuit attempts to maintain a constant output voltage and allows increased amounts of current to flow through the regulating transistor 18 which may lead to excessive power dissipation therein.

A protective circuit in the form illustrated in my issued patent described above may be used to disable the negative feedback control circuit and to reduce the current flow through the regulating transistor 18, under conditions in which the relationship between the voltage appearing across the transistor, E, and the current flow therethrough, I, does not create a power dissipation in excess of the power dissipation rating of the transistor 18. However, where the rectifier 13 is arranged to provide a relatively high voltage output, a high conductance accompanying a short circuit or heavy overload condition in the load circuit connected to the terminals 16 and 17 causes a voltage drop to appear between the collector and emitter of the regulating transistor 18 which may approach the value of the unidirectional voltage from the bridge rectifier 13. The result is that the power dissipation relationship $E \times I$ dictates that the current flow through the regulating transistor be reduced to a very low value or cut off during overload to preclude damage to the regulating transistor 18.

The arrangement of FIG. 3 includes a unique arrangement of a protective circuit, in accordance with the invention, including a means for reducing the average current flow through the regulating transistor 18 to a value at which the power dissipation occurring therein is less than the power dissipation rating of the regulating transistor 18 whenever an overload condition exists. An additional feature of the arrangement of FIG. 3 is the provision of means for controlling the duty cycle within which a switching means functions to turn the current flowing through the transistor 18 on and off for relative periods which produce an average current flow of desired low value, while at the same time allowing the circuit to automatically recover for normal operation whenever the overload condition is no longer present.

The protect circuit of the regulated power supply in FIG. 3 includes a sensing transistor 25 which controls the conductive states of a pair of transistors 26 and 27 connected in the manner of a Schmidt trigger circuit. Each of the transistors 25, 26 and 27 receives operating voltage via a common resistor 28 connected to the positive output of the bridge rectifier circuit 13. The various components of the protect circuit are all returned to a common connection 29 which receives a bias potential due to the operation of a zener diode 30. The zener diode 30 produces a constant voltage drop of the order of 1 to 5 volts which holds the common connection 29 at a corresponding voltage below the grounded negative output terminal 17 so that under overload conditions the transistor 27 may be rendered conducting to provide a low impedance path to ground through which substantially all of the current is by-passed from the control transistor 21, thereby effectively disabling the negative feedback control circuit described above, while at the same time applying a bias to the base of the regulating transistor 18 which reduces the current flow therethrough to a value at which the power dissipation occurring therein is within the power dissipation rating of the transistor.

A current sampling resistor 31 is connected serially in the return to the bridge rectifier 13 to provide a voltage representing the value of current flow through the regulating transistor 18. The voltage appearing across the resistor 31 is applied to the emitter of the sensing transistor 25. By virtue of a voltage divider comprising the resistors 32, 33 and 34, a fixed bias may be applied to the base of the sensing transistor 25. In a preferred embodiment, a voltage regulating zener diode 35 may be connected across the voltage divider of the resistors 32–34 so as to maintain the bias on the base of the transistor 25 at a constant value.

The collector of the sensing transistor 25 receives operating potential via a collector resistor 36 which also functions as part of the voltage divider including a voltage dropping zener diode 37 and a resistor 38. The base of the transistor 26 is connected to the junction point between the zener diode 37 and the resistor 38 so as to receive a voltage which in the normal non-overload condition of operation of circuit is maintained at a substantially fixed value. Since the voltage applied to the base of the transistor 26 is positive with respect to the voltage applied to its emitter via a common emitter resistor 39, the transistor 26 is normally conducting. In contrast, a voltage divider comprising a collector resistor 40 of the transistor 26 operating in conjunction with a resistor 41 and a resistor 42, applies a voltage to the base of the transistor 27 which, under normal non-overload operating conditions, is negative with respect to the voltage produced at the emitter of the transistor 27 by the current flow through the resistor 39 from the transistor 26. Thus, in normal non-overload operating conditions, the left-hand transistor 26 of the trigger circuit is substantially conductive while the right-hand transistor 27 of the circuit is rendered substantially cut-off. With the right-hand transistor 27 of the Schmidt trigger circuit cut-off, the protect circuit does not affect the operation of the negative feedback control circuit operating through the control transistor 21 in establishing conditions of bias on the regulating transistor 18 to maintain a substantially constant output voltage at the terminals 16 and 17.

However, in the operation of the circuit during an overload condition, the current sampling resistor 31 produces a voltage representing the value of the conductance of the load circuit, i.e., degree of overload which, when applied to the emitter of the transistor 25, increases the base emitter current with the result that the potential at the collector of the sensing transistor 25 is decreased. A capacitor 43 discharges through the conductive path afforded by the transistor 25 at a rate dependent upon the voltage appearing across the sampling resistor 31, and the potential applied to the base of the left-hand transistor 26 of the Schmidt trigger circuit drops accordingly so as to reduce conduction therethrough and to apply an increased potential to the base of the right-hand transistor 27 while at the same time reducing the potential at the emitter of the right-hand transistor 27. The result is that the right-hand transistor 27 commences conduction which increases the voltage drop across the resistor 39 and hence, tends to reduce conduction in the left-hand transistor 26. The action is cumulative so that the right-hand transistor 27 becomes substantially conducting, while the left-hand transistor 26 becomes substantially cut-off. Accordingly, during the period in which the right-hand transistor 27 is conducting, current is diverted from the control transistor 21 so as to reduce the potential on the base of the amplifying transistor 22 which, in turn, reduces the potential on the base of the regulating transistor 18 to a level at which negligible current flows therethrough. At the same time, however, the current flow through the current sampling resistor 31 is reduced so that the base emitter current of the transistor 25 is decreased with a resultant reduction in current flow therethrough. This causes the capacitor 43 to charge via the resistors 28 and 36 until a level has been reached at which the potential applied to the base of the left-hand transistor 26 of the Schmidt trigger circuit increases conduction therein, which, in turn, applies potentials to the base and emitter of the right-hand transistor 27 of the Schmidt trigger circuit which tend to reduce conduction therein.

Again, the action is cumulative so that the left-hand transistor 26 becomes substantially conducting while the right-hand transistor 27 becomes substantially cut-off. If, at this time, the overload condition persists, an increase in current flow through the regulating transistor 18 occurs and an increase in voltage across the current sampling resistor 31 is produced representing the value of the load conductance which commences the above-described operation anew. However, so long as the alternate conduction periods within which the regulating transistor 18 is allowed to conduct are such that the average current flow through the regulating transistor 18 is of a suitably low value, the power dissipation occurring therein may be made to be less than the maximum permissible power dissipation rating of the device.

Therefore, the protective circuit, including the switching means of the Schmidt trigger circuit, comprising the transistors 26 and 27, may be allowed to cycle back and forth with no damage occurring to the regulating transistor 18. However, as soon as the overload condition vanishes, the circuit returns to the normal condition of operation in which the right-hand transistor 27 of the Schmidt trigger circuit is cut-off, so that the negative feedback control circuit may function through the control transistor 21 to maintain a substantially constant output voltage at the terminals 16 and 17.

The relative times of conduction and reduced current flow through the transistor 18 are determined in the circuit of FIG. 3 by the relationship between the charge and discharge rate of the capacitor 43. During the period in which the capacitor 43 is discharging through the transistor 25, the value of the voltage appearing across the current sampling resistor 31 determines the rate of discharge. Hence, the period during which the Schmidt trigger circuit allows current to flow through the regulating transistor is determined by the value of the load conductance so that the average value of the current flow through the regulating transistor 18, taking into account an entire cycle of the Schmidt trigger circuit, is controlled as an inverse function of the load conductance.

During the period in which the Schmidt trigger circuit operates to restrict the current flow through the regulating transistor 18, the capacitor 43 charges through the resistor 36. Hence, the duty cycle as well as the frequency of the Schmidt trigger circuit is controlled in accordance with the value of the load conductance since the rate of discharge of the capacitor 43 is dependent upon the value of the voltage appearing across the current sensing resistor 31. In order to preclude any possible damage to the regulating transistor 18 due to currents flowing therethrough in excess of the $i^2t$ rating of the transistor, the value of the capacitor 43 in its relationship to the discharge paths provided through the zener diode 37 and the resistor 38 as well as the transistor 25 and the value of the voltage appearing across the current sensing resistor 31 for given overload current conditions should be selected so that the Schmidt trigger circuit is actuated sufficiently fast to restrict the current flow through the regulating transistor 18 so that the aforesaid $i^2t$ rating of the device is not exceeded. Furthermore, the value of the capacitor 43 in its relationship to the discharge paths provided through the zener diode 37 and the resistor 38 as well as through the sensing transistor 25 should be selected so that the average current value through the transistor for all values of load conductance results in power dissipations within the regulating transistor 18 within the maximum permissible power dissipation rating of the device.

Below is an example of the operation of the regulating transistor 18 for three overload conditions, one a short circuit:

| $I_L$ (instantaneous) | PW | PRF (cycles) | $P_D$(W) | Average Watts |
|---|---|---|---|---|
| 150 ma | .05 | 6 | 9 | 2.7 |
| 250 ma | .01 | 10 | 15 | 1.5 |
| Shorted condition, 500 ma | .006 | 10 | 30 | 1.8 |

Formula:

$$P_A = (PW)(PRF)(P_p)$$

where $I_L$=Load Current (instantaneous), $PA$=Average Power, $PW$=Pulse Width, $PRW$=Pulse Repetition Rate and $P_p$=Peak Power.

The resistor 33 associated with the voltage divider for applying the bias to the base of the sensing transistor 25 may be made adjustable so as to permit setting of the circuit for normal operation during normal conditions of current drawn from the output terminals 16 and 17. A resistor 44 may be connected from the positive side of the bridge rectifier 13 and the right-hand end of the zener diode 30 so that the zener diode 30 receives sufficient current to produce a constant voltage on the common connection 29. Due to the maintenance of the protect circuit slightly below ground reference potential through the operation of the zener diode 30, the right-hand transistor 27 of the Schmidt trigger circuit may be rendered conducting with substantially all of the current being bypassed from the sensing transistor 21 and a resultant decrease in current flow through the regulating transistor to an extremely low value. In the configuration illustrated, the sensing transistor 25 and each of the Schmidt trigger circuit transistors 26 and 27 may comprise an N-P-N type. However, it will be appreciated that the circuit may be readily modified to operate in conjunction with P-N-P type transistors as well.

As shown in FIG. 3, a filter capacitor 45 may be connected across the output terminals 16 and 17. However, in the event that a filter capacitor 45 is employed of relatively large capacitance value, sufficient current may be drawn in charging the capacitor to simulate an overload current condition under which the protect circuit cycles on and off. Accordingly, if the time constant of the filter capacitor 45, taken with its associated discharge path including the load attached to the terminals 16 and 17, is such that the capacitor 45 does not become charged during the cycling of the protect circuit, additional means such as a switch (not shown) must be utilized to reset the circuit of FIG. 3 subsequent to the occurrence of an overload condition. Such a reset switch may be arranged to disconnect momentarily the load circuit from the terminals 16 and 17 to allow the capacitor 45 to become charged.

The following list of circuit component values of the arrangement of FIG. 3 is given by way of example only of one workable embodiment:

| Component | Value |
|---|---|
| Capacitors 15 and 45 | 40 microfarads. |
| Capacitor 43 | 100 microfarads. |
| Resistor 20 | 120 ohms. |
| Resistors 23, 40 | 10,000 ohms. |
| Resistor 24 | 820 ohms. |
| Resistor 28 | 2,200 ohms. |
| Resistor 31 | 1 ohm. |
| Resistor 32 | 139,000 ohms. |
| Resistor 33 | 500 ohms potentiometer. |
| Resistor 34 | 390 ohms. |
| Resistor 36 | 6,800 ohms. |
| Resistor 38 | 470 ohms. |
| Resistor 39 | 100 ohms. |
| Resistor 41 | 27,000 ohms. |
| Resistor 42 | 2,200 ohms. |
| Transistor 18 | Type 970. |
| Transistors 21, 25, 26, 27 | Type 2N338. |
| Transistor 22 | Type 2N244. |
| Zener diode 19 | 30 volts (may comprise six 5-volt zener diodes connected serially). |
| Zener diode 30 | 5 volts. |
| Zener diode 35 | 30 volts (may comprise six 5-volt zener diodes connected serially). |
| Zener diode 37 | 10 volts (may comprise two 5-volt zener diodes connected serially). |

Figure 4:
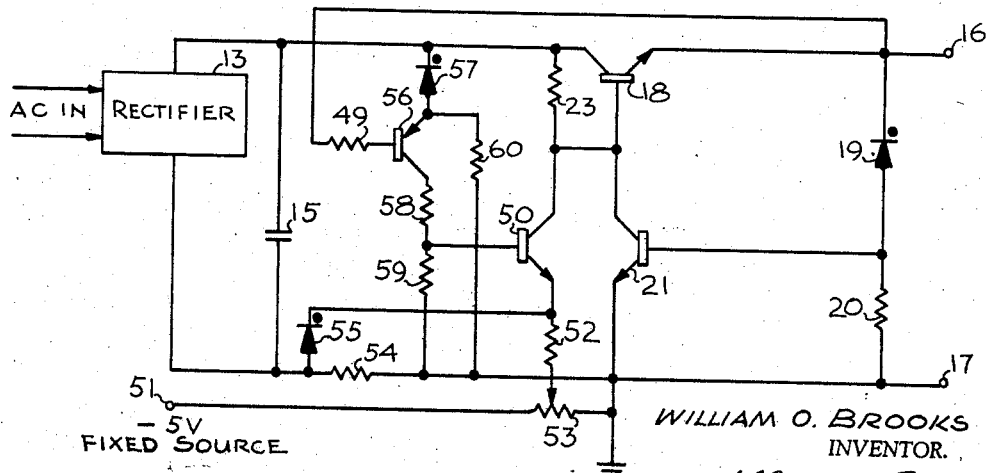
FIG. 4 is a combined block and schematic circuit diagram of a regulated power supply in accordance with the invention including both current limiting and voltage sensitive protective circuits.

An alternative arrangement of the invention is illustrated in FIG. 4 in which the combined operation of a current sensing protect circuit and a voltage sensing protect circuit interact to protect a regulating element from excessive power dissipation by controlling the current flow therethrough as an inverse function of load conductance. In both FIGS. 3 and 4, like reference characters have been employed to designate like elements of the circuit. Accordingly, in FIG. 4, an alternating current from a suitable source may be applied to a rectifier 13 across the output of which there is connected a filter capacitor 15; a regulating transistor 18 is connected serially between the rectifier 13 and one of a pair of output terminals 16 and 17; and a negative feedback control circuit comprising a zener diode 19, a resistor 20, a control transistor 21 and a resistor 23 function as described above to control the bias on the base of the regulating transistor 18 to maintain a substantially constant unidirectional voltage between the terminals 16 and 17. The current sensing protect circuit illustrated in FIG. 4 is similar to that shown and described in my co-pending application referred to above.

In operation, a protect circuit transistor 50 is connected in parallel with the control transistor 21 with the emitter of the transistor 50 being returned to a fixed negative potential applied to a terminal 51 via a fixed resistor 52 and a variable resistor 53. In the presence of an overload current condition, a voltage appears across a current sensing resistor 54. At a predetermined level of the voltage appearing across the resistor 54, a zener diode 55 is rendered conducting, so that a voltage is applied between the emitter and base of the transistor 50 in a direction which renders the transistor 50 conducting. When the transistor 50 is conducting, current is by-passed from the control transistor 21 so that a voltage is applied to the base of the transistor 18 which tends to reduce the flow of current therethrough. The current limiting circuit performs in an exemplary fashion to reduce the current flow through a regulating transistor to a level lower than the $i^2t$ rating of the transistor and protects the transistor from damage providing the voltage drop across transistor under overload current conditions does not produce an excessive power dissipation therein when taken with the current flow therethrough. However, where the voltage appearing at the output of the rectifier 13 is relatively high, a relatively large voltage may appear between the collector and emitter of the regulating transistor 18 under overload or short circuit conditions. The result is that the relatively linear operation of the current sensitive protect circuit acting alone is insufficient to reduce the power dissipation within the transistor 18 to a safe level. Accordingly, there was described above in connection with FIG. 2, one arrangement of a protect circuit utilizing a switching element for controlling the average current flow through a regulating transistor as an inverse function of the load conductance so that the power dissipation is held at a safe value.

The arrangement of FIG. 4 illustrates an alternative protect circuit within which the current sensitive circuit described above interacts with a voltage sensitive circuit to achieve a control of the current flow through the regulating transistor as an inverse function of load conductance. Thus, in FIG. 4, when the current sensitive circuit functions to reduce the current flow through the transistor 18, a voltage appears across the transistor 18 which is applied to the base of a voltage sensing transistor 56 via a resistor 49. Since in the illustrative arrangement of FIG. 4 the transistor 56 is of a P-N-P variety, the voltage drop appearing across the transistor 18 and applied to the transistor 56 between the emitter and base tends to increase the flow of current therethrough. When the voltage across a zener diode 57 reaches a predetermined level, the zener diode is rendered conducting so that current flows through a resistor 60 to maintain the emitter of transistor 56 at all times at predetermined level below the potential of the collector of transistor 18. Consequently, as the voltage drop across the regulating transistor 18 is applied to the base of transistor 56 via resistor 49 so that it becomes sufficiently negative with respect to the emitter, then the transistor 56 conducts with the result that a voltage appears at the junction point between a pair of resistors 58 and 59 connected serially with the collector of the transistor 56. Since the magnitude of the voltage appearing across the transistor 18 is a function of the conductance of a load or other circuit connected between the output terminals 16 and 17, the transistor 56 is rendered conductive to a degree dependent upon the load conductance. The voltage sensing transistor 56 when rendered conducting applies a bias to the base of the protect circuit control transistor 50 in a forward direction so that additional amounts of current are diverted from the control circuit transistor 21 again in accordance with the value of the load conductance. Thus, due to the combined operation of the current sensitive circuit controlling the potential at the emitter and the voltage sensitive circuit controlling the potential at the base of the transistor 50, a relationship is established in which the impedance of transistor 50 as reduced in accordance with the magnitude of this emiter-to-base potential. Thus the lower potential applied to the base of the regulating transistor 18 reduces the current flow therethrough to a value in accordance with an inverse function of load conductance so that the relationship EI between the voltage across the transistor and the current flow therethrough produces a power dissipation within the power dissipation rating of the device.

By adjustment of the variable resistor 53, the amount of current flow through the regulating transistor 18 and hence, the power dissipation therein during an overload condition may be adjusted. With a sufficiently negative voltage being applied to the emitter of the transistor 50, substantially all current flow through the regulating transistor 18 may be inhibited. However, where the current flow through the transistor 18 is reduced to substantially zero, the arrangement of FIG. 4 operates to latch in position during an overload condition so that the circuit must be reset for subsequent operation.

In contrast, where a small amount of current is allowed to flow through the regulating transistor 18 under an overload current condition, the circuit restores itself to normal operation automatically upon the disappearance of an overload or short circuit condition.

In the arrangement of FIG. 4, N-P-N variety transistors have been illustrated throughout, with the exception of the voltage sensing transistor 56 which is illustrated as being a P-N-P type. As is well known, opposite conductivity types may be substituted for each of the transistors if desired through a reorientation of the applied voltages in accordance with principles well known in the art.

Although the principles of the invention have been described above in connection with the block diagram of FIG. 1 and the specific circuit arrangements of FIGS. 3 and 4, it is intended that the illustrative arrangements be taken as exemplary only of suggested ways in which the invention may be utilized. Accordingly, the invention should be considered to include any and all variations, modifications or alternative arrangements falling within the scope of the annexed claims.

I claim:

1. A regulated power supply including the combination of a pair of output terminals, a source of unidirectional voltage, at least one transistor connected serially between the source of unidirectional voltage and one of the output terminals, means normally biasing the transistor to maintain a substantially constant unidirectional voltage across the output terminals, an impedance connected serially between the unidirectional voltage source and one of the output terminals, overload means having a pair of input terminals and an output terminal connected to the biasing means for limiting the current flow through the transistor under overload conditions in accordance with an inverse function of the value of the voltage applied to the input terminals, a current sensitive protect circuit coupled between the impedance and one input terminal of the overload means for actuating the overload means in response to a voltage of a predetermined magnitude appearing across the impedance and being applied to said one input terminal, and a voltage sensitive protect circuit coupled between the transistor and the other input terminal of the overload means for applying to said other input terminal a voltage proportional to the value of the voltage appearing across the transistor whereby the power dissipation within the transistor is held below the maximum permissible power dissipation rating by controlling the current dissipation through the transistor as an inverse function of the current through and the voltage across the transistor during overload conditions.

2. A regulated power supply including the combination of a pair of output terminals, a source of unidirectional voltage, at least one transistor connected serially between the source of unidirectional voltage and one of the output terminals, means biasing the transistor to maintain a substantially constant unidirectional voltage across the output terminals under normal operating conditions, an overload current sensing means connected serially between the unidirectional voltage source and one of the output terminals, a current protect circuit coupled between the current sensing means and the transistor for limiting the maximum current flow through the transistor in proportion to the magnitude of an overload current condition, voltage sensing means connected across the transistor, and a voltage protect circuit coupled between the voltage sensing means and the transistor for further controlling the current flow through the transistor as an inverse function of the value of a voltage appearing across the transistor whereby the power dissipation within the transistor is maintained below the maximum permissible power dissipation rating of the transistor under overload conditions.

3. In a series type regulated power supply system designated to deliver power at a substantially constant given output voltage to all electrical loads the conductance values of which do not exceed a predetermined maximum value, said system including a source of electrical power serially coupled by means of a controllable impedance to a set of power supply output terminals, the voltage provided by and current supplying capabilities of said source being of values such that the maximum safe average power dissipation rating characterizing said controllable impedance tends to be exceeded for values of load conductance substantially above said predetermined maximum, the combination: voltage regulation means operatively coupled between the power supply system output terminals and the controllable impedance for controlling the value of the impedance as a positive function of power supply system output voltage to maintain a substantially constant value of power supply voltage for all values of load conductances up to said predetermined maximum; means operatively coupled to the impedance and having an input responsive to at least the voltage appearing across the impedance for reducing the current flow through the impedance as a positive function of the value of voltage appearing across the impedance, said means being such that said positive function of current reduction maintains the power dissipation within the impedance substantially constant and below said predetermined maximum safe average power dissipation rating characterizing the controllable impedance for all values of load conductance exceeding said predetermined maximum; current sensing means coupled in series between the source of electrical power and the power supply output terminals for sensing the value of load conduction and means coupled to said last named means for enabling said means for reducing the current flow only during the connection to the power supply system of electrical loads, the conductance values of which exceed said predetermined maximum value of load conductance.

4. In a controlled power supply system for delivering power at a predetermined desired value of output voltage to all electrical loads the conductance values of which do not exceed a predetermined maximum value, said system including a source of electrical power serially coupled by means of a controllable impedance to a set of power supply output terminals, the voltage provided by and current supplying capabilities of said source, being of values such that the maximum safe average power dissipation rating characterizing said controllable impedance tends to be exceeded for values of load conductance substantially above said predetermined maximum, the combination of: voltage control means operative responsive to power supply system output voltage and coupled to the controllable impedance for producing a signal for controlling the value of the impedance as a function of the desired power supply system output voltage to be supplied to all electrical loads the conductance values of which do not exceed said predetermined maximum; normally disabled means operatively included in said power supply system and connected to said controllable impedance for regulating the value of average power dissipation within the controllable impedance, said normally disabled means having input means for determining the conductance value of loads connected in power accepting relation to the power supply system by measuring the voltage across the controlable impedance, said normally disabled means also having output means responsive to the input means for providing a signal for all load conductance values in excess of said predetermined maximum value of load conductance to limit the average power dissipation within the impedance to substantially constant and at a value below said predetermined safe maximum value of average power dissipation; and means operatively coupled to said voltage control means and said last named means for measuring the current flow from the source of electrical power and concurrently disabling said voltage control means and enabling said normally disabled means only during the connection to said power supply terminals of electrical loads, the conductance values of which substantially exceed said predetermined maximum value of load conductance.

References Cited in the file of this patent

UNITED STATES PATENTS

| | | |
|---|---|---|
| 2,776,382 | Jensen | Jan. 1, 1957 |
| 2,832,900 | Ford | Apr. 29, 1958 |
| 2,888,633 | Carter | May 26, 1959 |
| 2,904,742 | Chase | Sept. 15, 1959 |
| 2,915,693 | Harrison | Dec. 1, 1959 |